(12) United States Patent
Ishii et al.

(10) Patent No.: US 8,725,282 B2
(45) Date of Patent: May 13, 2014

(54) METHOD FOR LINKING WORK ATTRIBUTE INFORMATION, ITS SYSTEM AND MODEL STRUCTURE OF SHEET METAL COMPONENT

(75) Inventors: Masanobu Ishii, Laguna Hills, CA (US); Koichi Tsuchida, Isehara (JP); Toshio Takagi, Isehara (JP); Akihiko Sanguu, Isehara (JP)

(73) Assignee: Amada Company, Limited, Kanagawa (JP)

( * ) Notice: Subject to any disclaimer, the term of this patent is extended or adjusted under 35 U.S.C. 154(b) by 2766 days.

(21) Appl. No.: 10/488,246

(22) PCT Filed: Sep. 6, 2002

(86) PCT No.: PCT/JP02/00910
§ 371 (c)(1),
(2), (4) Date: Jul. 30, 2012

(87) PCT Pub. No.: WO03/030035
PCT Pub. Date: Apr. 10, 2003

(65) Prior Publication Data
US 2012/0109587 A1    May 3, 2012

(30) Foreign Application Priority Data

Sep. 11, 2001  (JP) ................. 2001-275505
Sep. 13, 2001  (JP) ................. 2001-278075

(51) Int. Cl.
*G06F 19/00*  (2011.01)
*G06F 17/50*  (2006.01)

(52) U.S. Cl.
USPC ............................. 700/98; 703/1

(58) Field of Classification Search
None
See application file for complete search history.

(56) References Cited

U.S. PATENT DOCUMENTS

| | | | |
|---|---|---|---|
| 5,526,478 A | 6/1996 | Russell, Jr. et al. | |
| 5,886,897 A | 3/1999 | Hazama et al. | |
| 6,209,420 B1* | 4/2001 | Butcher et al. | 76/108.2 |
| 6,212,441 B1* | 4/2001 | Hazama et al. | 700/98 |
| 6,397,117 B1* | 5/2002 | Burrows et al. | 700/97 |
| 6,411,862 B1 | 6/2002 | Hazama et al. | |

(Continued)

FOREIGN PATENT DOCUMENTS

| | | |
|---|---|---|
| JP | 6-231215 | 8/1994 |
| JP | 7-191721 | 7/1995 |

(Continued)

OTHER PUBLICATIONS

Rodriguez, "Sheet Metal Design: beyond Bends and Flanges", presentation to Autodesk University, at Walt Disney World Swan and Dolphin Resort, Orlando, Florida, 2005, pp. 1-16.*

(Continued)

*Primary Examiner* — Kakali Chaki
*Assistant Examiner* — Walter Hanchak
(74) *Attorney, Agent, or Firm* — Greenblum & Bernstein, P.L.C.

(57) ABSTRACT

A system for editing sheet metal components using a computer, comprising a sheet metal object having graphic element data defining the graphic elements of a sheet metal and connection data defining face data comprising graphic elements and linkage of the faces, wherein the sheet metal object includes a sheet metal edition object corresponding to editing of a sheet metal, e.g., editing of butting or lapping of sheets, and the burden is lessened by automating reformation at the butting or lapping part of the sheet metals.

15 Claims, 17 Drawing Sheets

(56) References Cited

U.S. PATENT DOCUMENTS

| | | | |
|---|---|---|---|
| 6,928,396 | B2 | 8/2005 | Thackston |
| 2002/0035450 | A1* | 3/2002 | Thackston ........................ 703/1 |
| 2002/0039108 | A1* | 4/2002 | Roy et al. ...................... 345/619 |

FOREIGN PATENT DOCUMENTS

| | | |
|---|---|---|
| JP | 2000-322459 | 11/2000 |
| JP | 2001-101237 | 4/2001 |
| JP | 2001-142517 | 5/2001 |
| JP | 2001-202111 | 7/2001 |
| JP | 2001-209417 | 8/2001 |
| WO | 97/42586 | 11/1997 |
| WO | 99/63491 | 12/1999 |
| WO | 00/55705 | 9/2000 |

OTHER PUBLICATIONS

Diegel, "BendWorks, the Fine-art of Sheet Metal Beding", broshure for Olaf Diegel, Complete Design Services, Jul. 2002 download: http://www.ciri.org.nz/bendworks/bending.pdf, pp. 1-9.*
English Language Abstract of JP 2001-101237.
English Language Abstract of JP 2001-142517.
English Language Abstract of JP 7-191721.
English Language Abstract of JP 6-231215.
English Language Abstract of JP 2000-322459.
English Language Abstract of JP 2001-209417.
Dong et al., "Managing design information in enterprise-wide CAD using 'smart drawings'", Computer Aided Design, Elsevier Publishers BV., Barking, GB LNKD-DOI: 10.1016/S0010-4485(97)00095-X, vol. 30, No. 6, pp. 425-435 (May 1, 1998).
Search report from E.P.O., mail date is Oct. 29, 2010.

* cited by examiner

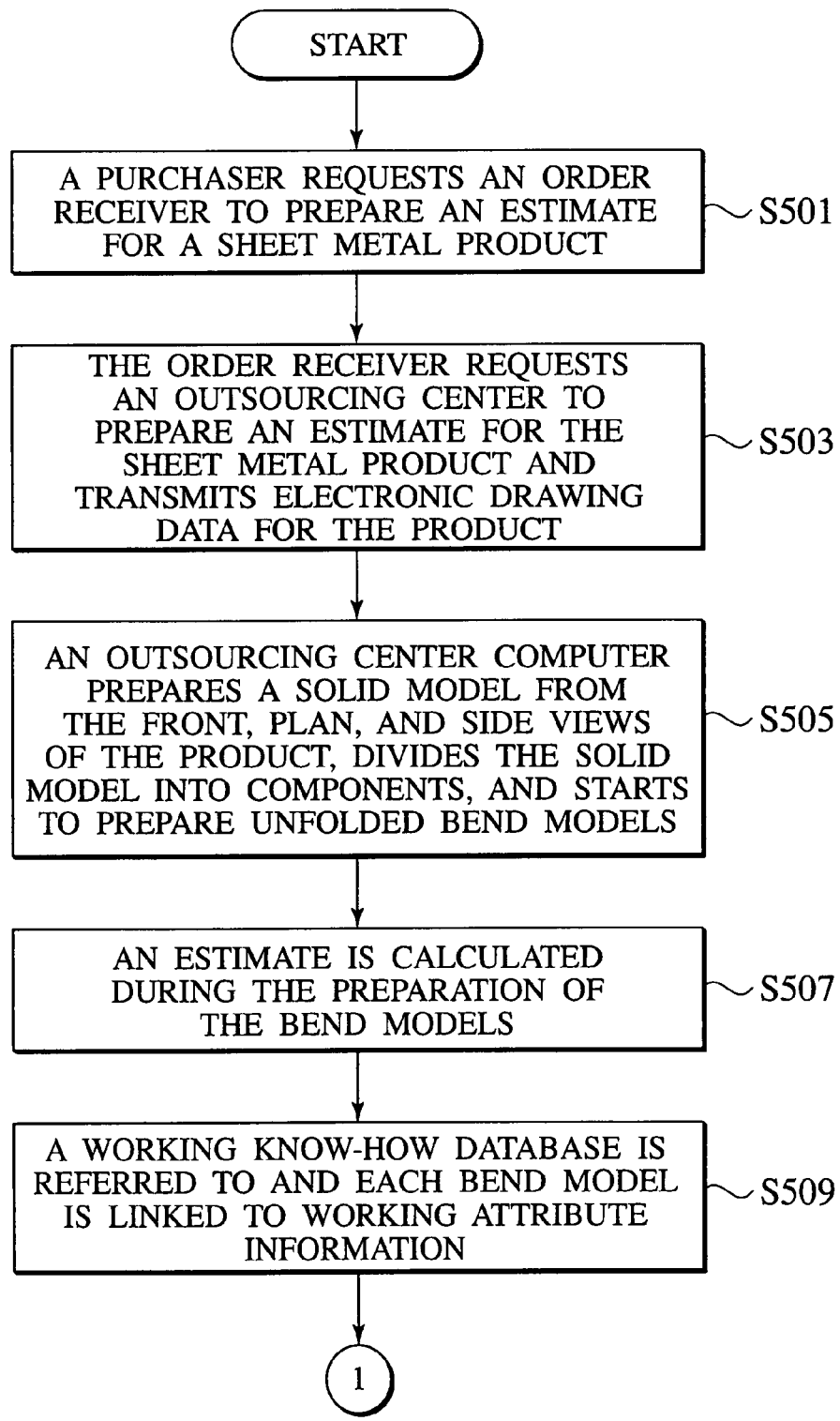

METHOD FOR LINKING WORK ATTRIBUTE INFORMATION, ITS SYSTEM AND MODEL STRUCTURE OF SHEET METAL COMPONENT

TECHNICAL FIELD

The present invention relates to a working attribute information linking method, a system for the same, and a model structure of a sheet metal component, and particularly, to a working attribute information linking method and a system for the same to provide a new outsourcing contractor with working know-how accumulated through, for example, outsourcing services by linking working attribute information to a bend model, i.e., a three-dimensional solid model of a sheet metal product and a model structure of a sheet metal component used to edit the sheet metal component by computer.

BACKGROUND ART

Generally, a bend model or a three-dimensional solid model of, for example, a sheet metal product is provided with working attribute information which is electronic data representing only part of written information on design drawings of the sheet metal product prepared at a purchaser.

Namely, the working attribute information to be provided is standard attribute data such as data for dividing a model into component models and bend line data for unfolding bend positions of a bend model.

Working attribute information for preparing NC data for NC-machining a sheet metal product is added to, for example, an unfolded form of a component model.

On the other hand, an outsourcing center partly takes over the manufacturing of a sheet metal product for an order receiver according to a request from the order receiver. The outsourcing center also takes over computer operation (for example, CAD/CAM operation) for the order receiver. Working know-how (for example, tips for special working) obtained from the work relegated to the outsourcing center is only verbally informed to persons concerned.

Such a conventional working attribute information linking method has problems mentioned below.

Namely, design drawings transmitted from a purchaser to an order receiver describe every piece of information necessary for manufacturing a sheet metal product, and therefore, all of such information pieces are required to be added as working attribute information to a bend model.

However, if the bend model and working attribute information employ different file formats, a bend model interface (for example, an interface program for reading bend model data for CAD/CAM software) of existing application software (for example, CAD/CAM software to handle bend models) must be corrected. This requires the updating of applications already supplied to vendors and increases the number of man-hours.

Another problem is that only adding partial information to a bend model hinders digitization of working know-how and prevents proper transfer of information.

For sheet metal component designing, computer aided design (CAD) has been employed to allow designers interactive designing with computers. The CAD employs, for example, object-oriented sheet metal models for the convenience of metal sheet component designing.

Designing sheet metal components involves the editing of butting parts of a sheet metal model. More precisely, it is necessary to edit a connection where nonparallel two sheet-metal faces butt against each other (butting) and a connection where parallel two sheet-metal faces lap over each other (lapping).

FIGS. 1A to 1E are views explaining concrete examples of editing a butting part on a conventional sheet metal model.

A sheet metal component having an unfolded view of FIG. 1A and a solid view of FIG. 1C is considered.

The sheet metal component has an apex "a" as shown in the solid view, and around the apex, involves a both-side-contracted butting part as shown in an enlarged partial view of FIG. 1B. In the FIGs., a dotted line represents a bend line, and the same is applicable to the following description.

After the editing of the sheet metal model, a sheet thickness or a welding method may be changed to raise a necessity of changing the butting part.

In an enlarged partial view of FIG. 1E, the butting part is changed to one-side-contracted butting. To achieve this, CAD must be employed to again edit the shape of sheet metal as shown in an unfolded view of FIG. 1D. This is because CAD stores only a final shape of sheet metal.

Arrow marks in FIGS. 1D and 1E indicate directions in which the sheet metal is extended from the one-side-contracted state serving as a reference to the both-side-contracted state.

According to the conventional sheet metal model, changing a butting part due to a change in sheet thickness or welding method after the editing of the model requires a repetition of the editing of the sheet metal model.

FIGS. 2A to 2F are views explaining concrete examples of editing to be carried out when a sheet thickness is changed on a conventional sheet metal model.

A sheet metal component shown in an unfolded view of FIG. 2A and an enlarged partial view of FIG. 2B corresponds to the sheet metal component changed to one-side-contracted butting in FIGS. 1A to 1E. Namely, FIG. 2A corresponds to FIG. 1D and FIG. 2B to FIG. 1E.

If the thickness of the sheet metal is increased under this state, areas "b" shown in an unfolded view of FIG. 2C and an enlarged partial view of FIG. 2D cause interference at the one-side-contracted butting. Namely, if sheet thickness is increased without changing the shapes shown in FIGS. 2A and 2B, two parts of the sheet metal simultaneously occupy the same area at "b" to collapse the sheet metal model.

To solve the interference, the sheet metal model must be edited again. Namely, the shape of the sheet metal must be changed as shown in an unfolded view of FIG. 2E to avoid the interference. This realizes a one-side-contracted butting part containing the sheet thickness change as shown in an enlarged partial view of FIG. 2F.

As mentioned above, the conventional sheet metal model needs, if a sheet thickness is changed after the completion of the sheet metal model, a repetition of the editing of the sheet metal model to control connection parts. This increases the labor of an operator who edits the model as well as a risk of erroneous changes during the editing.

DISCLOSURE OF INVENTION

In consideration of the above-mentioned problems, the present invention provides a working attribute information linking method for linking working attribute information to a bend model, i.e., a three-dimensional solid model of a sheet metal product. Desirably, the method includes the steps of displaying the bend model on a display unit and selecting a working attribute information adding location to which the working attribute information is linked, inputting the working attribute information to be linked to the working attribute information adding location, preparing a linkage between the working attribute information and the working attribute information adding location in the bend model, and storing the bend model in a bend model memory and the working attribute information in a working attribute information memory while maintaining the linkage.

Desirably, the method includes the step of displaying the bend model, working attribute information, and working attribute information adding location related to one another on the display unit.

Desirably, the step of displaying the bend model, working attribute information, and working attribute information adding location related to one another on the display unit includes the step of highlighting the working attribute information adding location of the bend model when the working attribute information is clicked.

Desirably, the method includes the editing step of changing, correcting, or deleting the working attribute information.

Desirably, the working attribute information is text data representative of the contents of working know-how.

Desirably, the method includes the step of retrieving the working attribute information to be added to the working attribute information adding location from a working know-how database that stores working know-how.

The present invention also provides a working attribute information linking system for linking working attribute information to a bend model, i.e., a three-dimensional solid model of a sheet metal product. Desirably, the system includes means for displaying the bend model on a display unit and selecting a working attribute information adding location to which the working attribute information is linked, means for inputting the working attribute information to be linked to the working attribute information adding location, means for preparing a linkage between the working attribute information and the working attribute information adding location in the bend model, and means for storing the bend model in a bend model memory and the working attribute information in a working attribute information memory while maintaining the linkage.

An object of the present invention is to provide also a model structure of a sheet metal component capable of reducing the labor of repetitively editing connections whenever a sheet thickness or a welding method is changed.

Desirably, the model structure of a sheet metal component according to the present invention is used for editing the sheet metal component with the use of a computer, that the model structure includes a sheet metal object having graphic element data to define graphic elements for sheet metal, face data to define faces each composed of graphic elements, and connection data to define each connection between faces, and that the sheet metal object includes a sheet metal editing object corresponding to a sheet metal editing process.

Desirably, the sheet metal editing object corresponds to an editing process of sheet butting or an editing process of sheet lapping.

Desirably, the sheet metal editing object corresponding to an editing process of sheet butting includes, as attributes, a butting kind of both-side contraction, one-side contraction, or both-side extension, a gap, and a gap type.

Desirably, the sheet metal editing object corresponding to an editing process of sheet lapping includes, as attributes, a lapping kind of one-side contraction, cutoff, oblique, or 45-degrees, a gap, and a gap type.

The present invention stores an editing process of sheet connection such as butting and lapping as an object in a sheet metal model and automatically changes an unfolded view in response to a change in a working method or material.

BRIEF DESCRIPTION OF DRAWINGS

FIGS. 7A and 7B are flowcharts explaining operation of the working attribute information linking system.

BEST MODE FOR CARRYING OUT THE INVENTION

Embodiments of a working attribute information linking method, a system for the same, and a model structure of a sheet metal component according to the present invention will be explained in detail with reference to the drawings.

First, a working attribute information linking method and a system for the same according to a first embodiment will be explained.

Figure 1A:
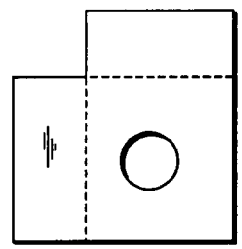
FIGS. 1A to 1E are views explaining concrete examples of the editing of a butting part in a conventional sheet metal model.
Figure 1B:
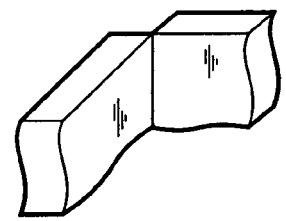
Figure 1C:
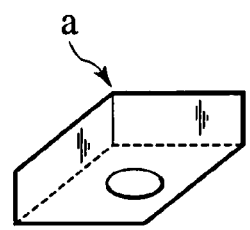
Figure 1D:
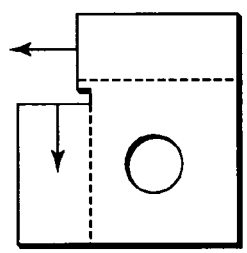
Figure 1E:
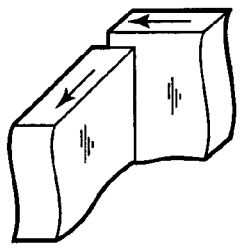
Figure 2A:
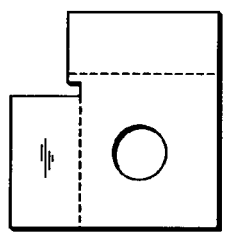
FIGS. 2A to 2F are views explaining concrete examples of the editing of a conventional sheet metal model when a sheet thickness is changed.
Figure 2B:
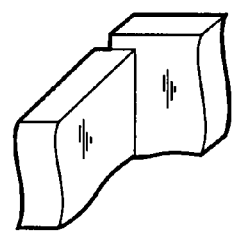
Figure 2C:
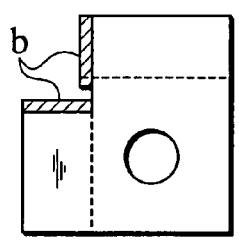
Figure 2D:
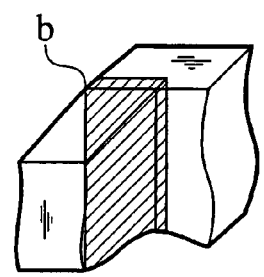
Figure 2E:
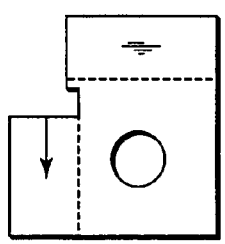
Figure 2F:
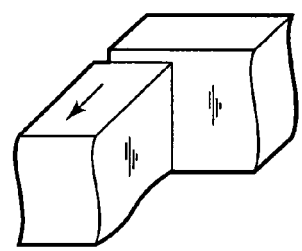
Figure 3:
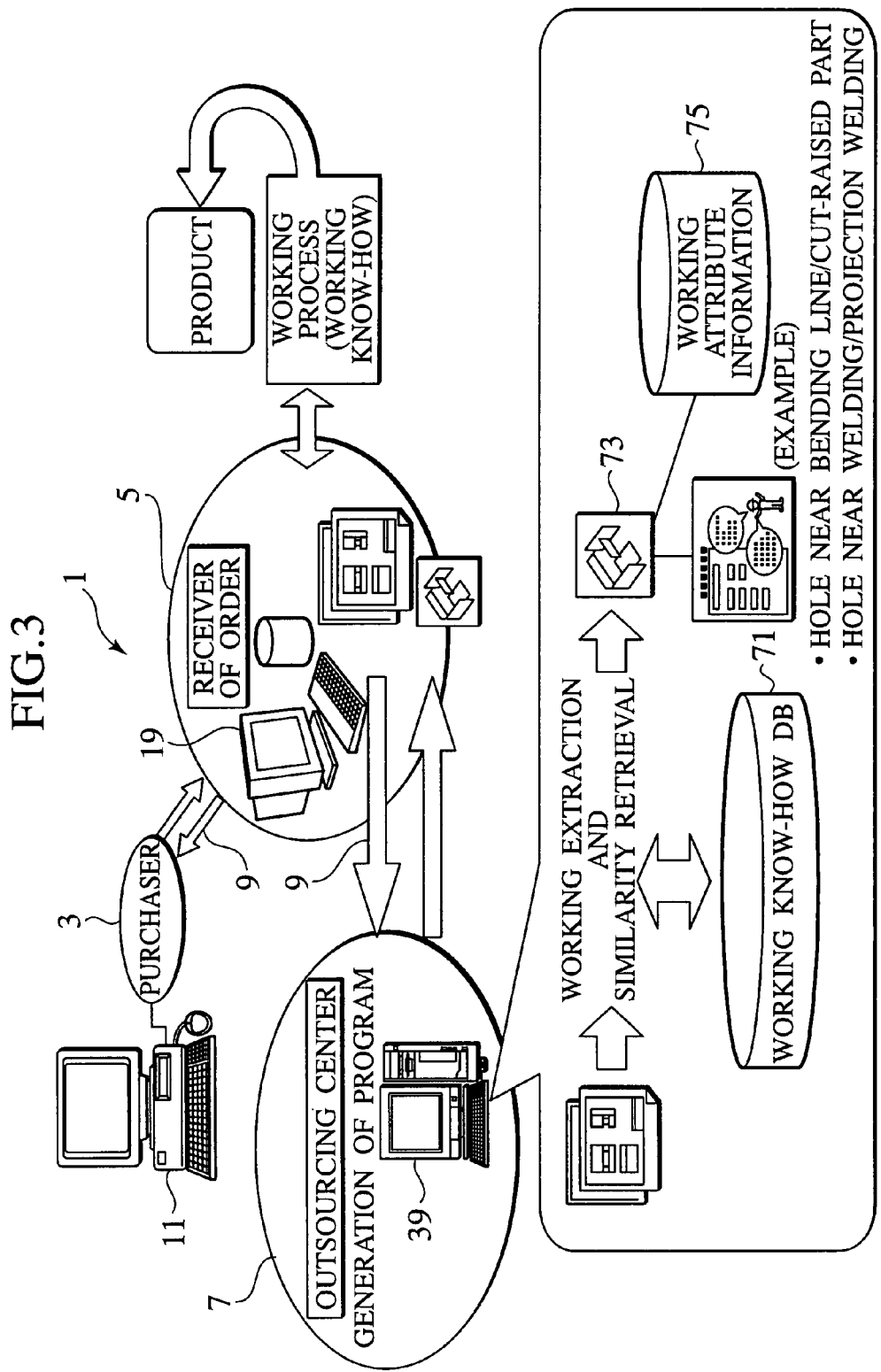
FIG. 3 is a schematic view showing a schematic structure of a working attribute information linking system.

FIG. 3 shows a schematic structure of the working attribute information linking system 1.

The working attribute information linking system 1 includes a purchaser 3 that makes a request for manufacturing a sheet metal product, an order receiver 5 that receives the sheet metal manufacturing request from the purchaser 3 and manufactures the sheet metal product, and an outsourcing center 7 that carries out part of the work to be done by the order receiver 5.

The purchaser 3, order receiver 5, and outsourcing center 7 communicate with one another through a communication system 9 such as the Internet.

The purchaser 3 has a purchaser computer 11. The order receiver 5 has an order receiver computer 19. The outsourcing center 7 has an outsourcing center computer 39.

The order receiver 5 requests the outsourcing center 7 to prepare, for example, an estimate and NC data for machine tools for machining the sheet metal product.

The outsourcing center 7 prepares estimate data, NC data, and the like. To prepare the NC data, a bend model, i.e., a three-dimensional model of the sheet metal product must be prepared as three-dimensional CAD data. Based on the bend model, the estimate data and NC data are prepared. At this time, the bend model is linked to working attribute information (for example, a bend line of the bend model is linked to working attribute information which may be text data showing that the bend must carefully be made because shaping is to be conducted around the bend line). When adding working attribute information to a bend model, working know-how concerned is retrieved from a working know-how database 71 and is referred to. The working know-how database 71 is a storage area to store information accumulated from outsourcing services previously achieved by the outsourcing center 7.

The working attribute information is stored in a memory separately from the bend model.

Namely, the bend model is stored in a bend model memory 73, and the working attribute information is stored in a working attribute information memory 75.

As a result, the bend model and working attribute information may have different file formats without correcting a bend model interface of an existing application.

This eliminates a need of updating the application already supplied to a vender and reduces the number of software maintaining man-hours.

Figure 4:
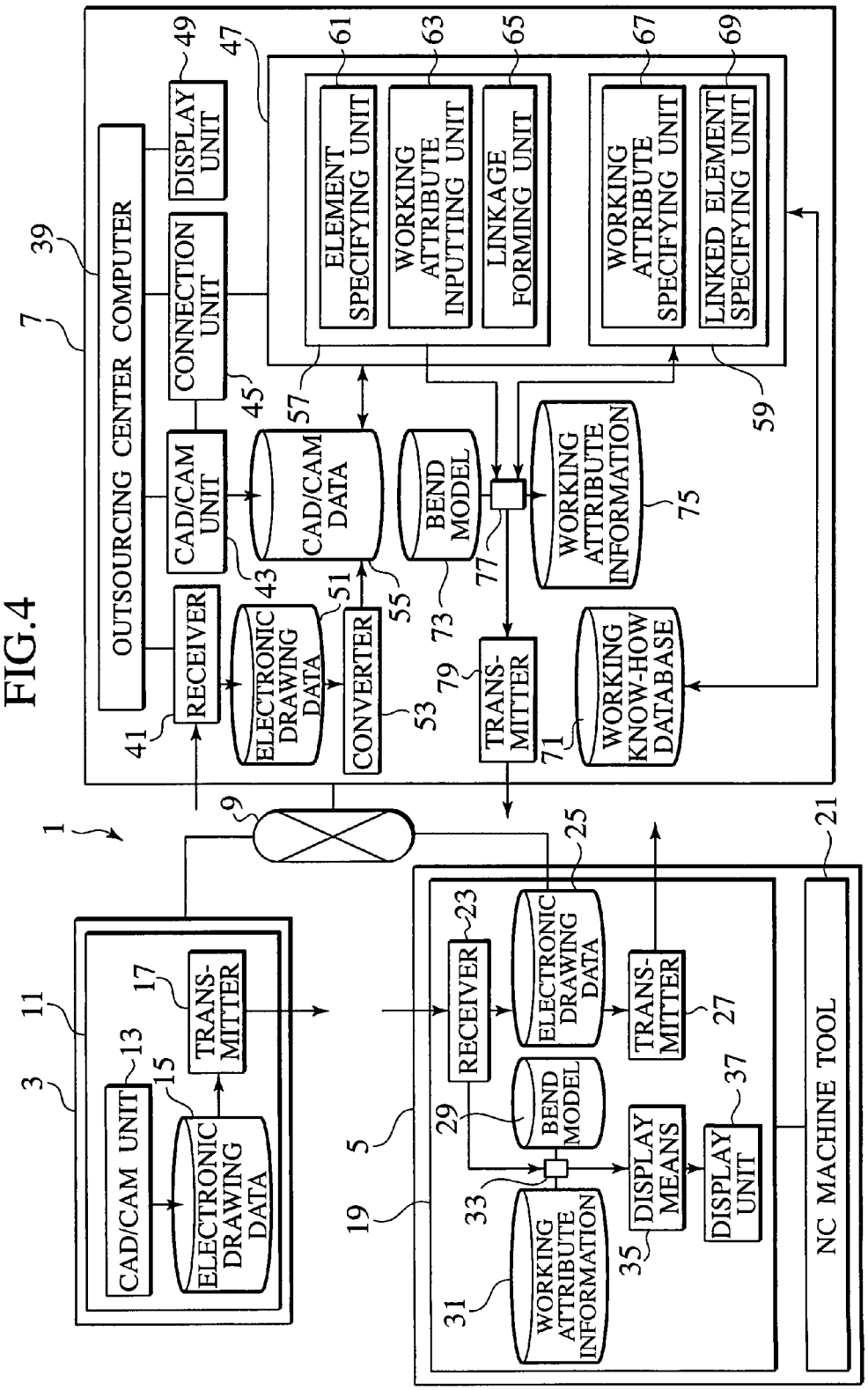
FIG. 4 is a schematic view showing a schematic structure of the working attribute information linking system.

With reference to FIG. 4, each processing unit will be explained.

The working attribute information linking system 1 includes, as mentioned above, the purchaser 3 that makes a request for manufacturing a sheet metal product, the order receiver 5 that receives the sheet metal manufacturing request from the purchaser 3 and manufactures the sheet metal product, and the outsourcing center 7 that carries out part of the work to be done by the order receiver 5.

The purchaser 3, order receiver 5, and outsourcing center 7 communicate with one another through the communication system 9 such as the Internet.

The purchaser 3 has the purchaser computer 11. The purchaser computer 11 includes a CAD/CAM unit 13 to design the product for the purchaser, an electronic drawing data memory 15 to store electronic drawing data designed by the CAD/CAM unit 13, and a transmitter 17 to read the electronic drawing data of the sheet metal product from the electronic drawing data memory and transmit the electronic drawing data to the order receiver 5, to request the order receiver for manufacturing the sheet metal product.

The order receiver 5 has the order receiver computer 19 and an NC machine tool 21 to machine the sheet metal product.

The order receiver computer 19 has a receiver 23, an electronic drawing data memory 25 to store electronic drawing data received through the receiver 23, and a transmitter 27 to transmit the electronic drawing data to the outsourcing center 7.

The order receiver 5 also has a bend model memory 29 to store a bend model received through the receiver 23 and a working attribute information memory 31 to store received working attribute information. A link unit 33 maintains a linkage between the bend model and the working attribute information.

According to this embodiment, a bend model is a three-dimensional solid model provided with electronic information representative of working attributes necessary for NC machine tools. The three-dimensional solid model is made by, for example, a three-dimensional CAD/CAM system.

A display unit 35 reads the bend model from the bend model memory 29 and the working attribute information from the working attribute information memory 31 and displays them on a display unit 37.

When displayed on the display unit 37, the bend model, working attribute information added locations (locations where working attribute information pieces are added) on the bend model, and the working attribute information are related to one another. As a result, an operator can easily refer to the working attribute information during actual working.

It is prompted to select working attribute information displayed on the display unit 37. When working attribute information is selected, a working attribute information added location (for example, an element) linked to the selected working attribute information and contained in the bend model is, for example, highlighted. As a result, the operator who makes the sheet metal product can easily refer to the working know-how. When a working attribute information added location is selected on the bend model, a linked piece of working attribute information is highlighted.

The outsourcing center 7 has the outsourcing center computer 39.

The outsourcing center computer 39 has a receiver 41, a CAD/CAM unit 43, a working attribute information managing unit 47 connected to the CAD/CAM unit 43 through a connection unit 45, and a display unit 49.

Electronic drawing data received by the receiver 41 is stored in an electronic drawing data memory 51. A converter 53 reads the electronic drawing data from the electronic drawing data memory 51, converts the same into CAD/CAM data for the own CAD/CAM unit 43, and stores it in a CAD/CAM data memory 55.

The CAD/CAM unit 43 reads the front, plan, and side views of the sheet metal product from the CAD/CAM data memory 55 and prepares a bend model (three-dimensional solid model). The bend model is divided into a plurality of component models, and for each of the component models, an unfolded view is prepared. Data related to the bend model, component models, and unfolded views are related to one another and are stored in the CAD/CAM data memory 55.

When the bend model of the sheet metal product is prepared, the president, factory manager, bending engineers, and the like of the order receiver 5 and the CAD/CAM operators of the outsourcing center 7 hold a working editing meeting to prepare estimate data and NC data for the sheet metal product. The estimate data is transmitted from the order receiver 5 to the purchaser 3. The NC data is used when the order receiver 5 receives an official order, to quickly start working.

On the other hand, the working attribute information managing unit 47 has a working attribute adding unit 57 and a working attribute editing unit 59.

The working attribute adding unit 57 has an element specifying unit 61, a working attribute inputting unit 63, and a linkage forming unit 65.

The element specifying unit 61 displays the bend model on the display unit 49 and prompts to click a working attribute information adding location (for example, an element such as a segment contained in the bend model) on the bend model with a mouse.

Once a click is made, the working attribute inputting unit 63 prompts to input, for example, working attribute information (for example, text data indicating that a hole is formed close to a bend line) with, for example, a keyboard. At this time, working know-how may be retrieved from the working know-how database 71 and be used to prepare the working attribute information.

The linkage forming unit 65 forms a linkage between the working attribute information adding location (for example, an element such as a segment) specified on the bend model and the working attribute information. Data concerning the bend model is stored in the bend model memory 73. On the other hand, the working attribute information is stored in the working attribute information memory 75. For these pieces of data, a link unit 77 maintains linkage.

Figure 5:
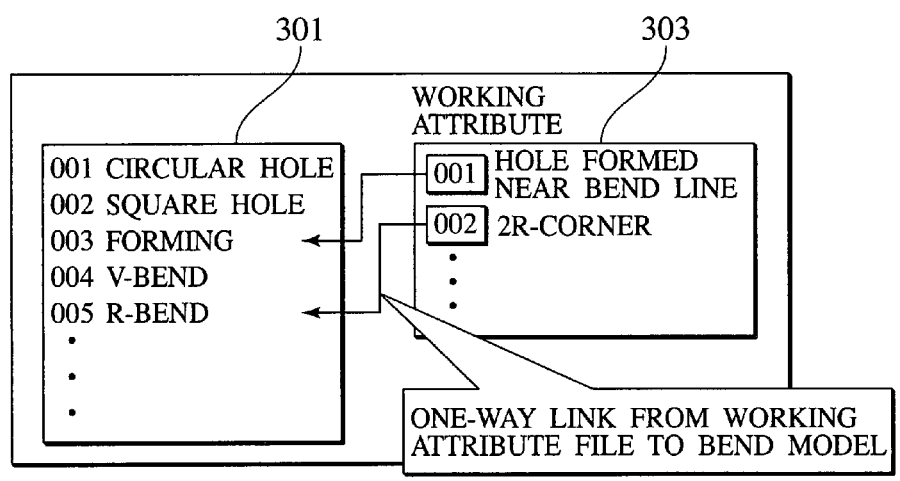
FIG. 5 is an explanatory view showing a linkage between a bend model and working attribute information.

FIG. 5 shows an example of the link unit. Namely, a linkage between element data 301 (for example, a numeral 001 represents a circular hole, a numeral 002 a square hole, a numeral 003 forming, a numeral 004 a V-bend, a numeral 005 an R-bend, and the like) related to a selected working attribute information adding location and working attribute information 303 (for example, a numeral 001 represents a hole formed near a bend line, a numeral 002 a 2R-corner, and the like) is maintained with the use of the sequential numbers.

In this way, a working attribute information added location (for example, an element such as a segment) on a bend model and working attribute information (for example, text data) linked thereto are separately stored in different memories with a linkage therebetween being maintained. Even if the bend model and working attribute information have different file formats, there is no need of correcting a bend model interface of existing application software.

Figure 6:
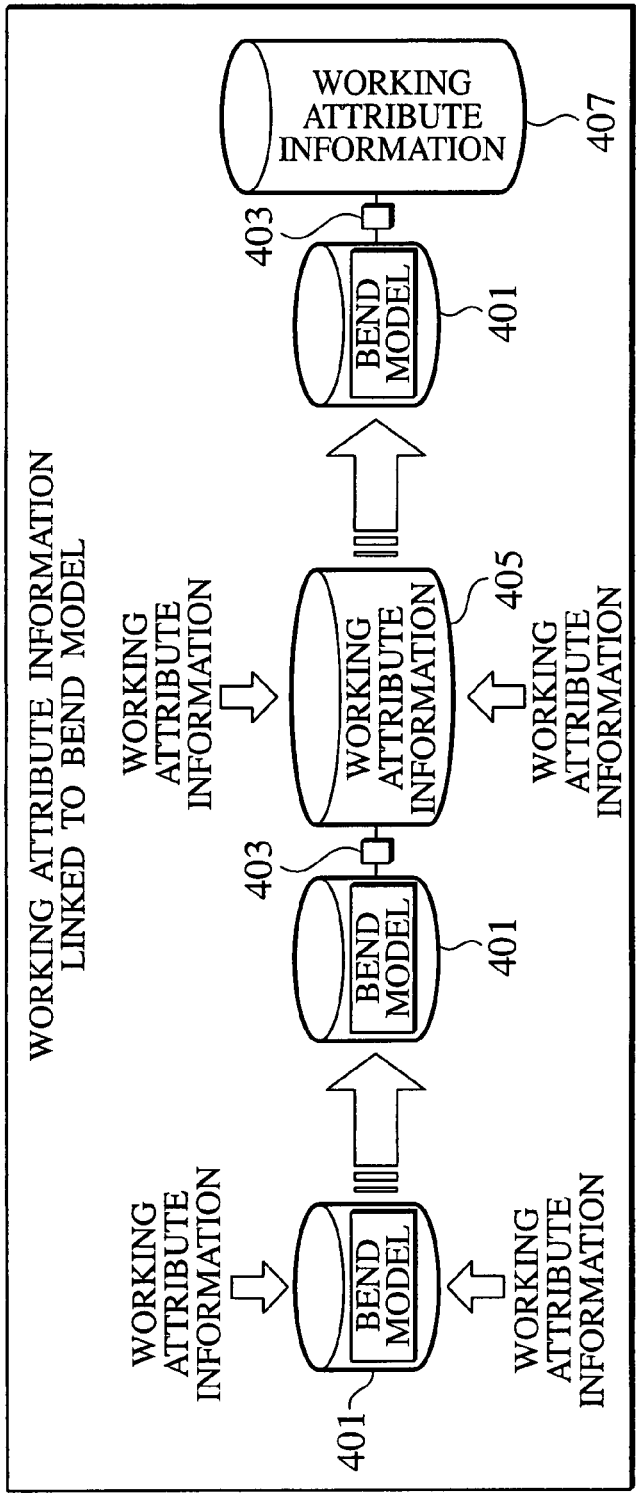
FIG. 6 is an explanatory view explaining the characteristics of linkage.

FIG. 6 shows that a bend model (a file format of the bend model) is independent of working attribute information (a file format of the working attribute information) linked to the bend model. The bend model 401 is provided with working attribute information, and a link unit 403 links working attribute information 405 to the bend model. If working attribute information is further added to the bend model 401, there will be expanded working attribute information 407. However, the data contents of the bend model 401 are unchanged.

When, for example, CAD/CAM software reads and edits a bend model, no working attribute information is read. On the other hand, an operator can refer to a bend model and working attribute information that is related to the bend model through the link unit.

The working attribute editing unit 59 has a working attribute specifying unit 67 and a linked element specifying unit 69.

The working attribute specifying unit 59 prompts to select working attribute information displayed on the display unit 49. Thereafter, the selected working attribute information is properly edited.

The linked element specifying unit 69 selects a working attribute information added location (for example, an element such as a segment) on a bend model to which the working attribute information is linked. As a result, the working attribute information linked to the selected working attribute information added location is edited.

A transmitter 79 transmits the bend model and working attribute information with a linkage being maintained therebetween by the link unit 77 to the order receiver 5. As a result, the order receiver computer 19 of the order receiver 5 can quickly execute application software using the bend model (for example, the bend model is displayed on the display unit to quickly start working).

With reference to FIGS. 7A to 9, operation of the working attribute information linking system 1 will be explained.

Reference is made to FIG. 7A. In step S501, the purchaser 3 requests the order receiver 5 to make an estimate for manufacturing a sheet metal product.

In step S503, the order receiver 5 requests the outsourcing center 7 to prepare an estimate for the metal sheet product. At this time, electronic drawing data and the like representative of design drawings of the sheet metal product are transmitted from the transmitter 27 to the outsourcing center 7.

In step S505, the outsourcing center computer 39 of the outsourcing center 7 prepares a solid model from the front, plan, and side views of the sheet metal product. The bend model of the sheet metal product is divided into component models (to perform proper processes). Thereafter, the component models are developed into unfolded views. The bend model, component models, unfolded views, and the like are related to one another.

In step S507, estimate data, NC data, and the like are prepared during the preparation of the bend model.

In step S509, the contents of the working know-how database are referred to, and working attribute information (for example, text data indicating that a shaping process is carried out in the vicinity of a bend line) is linked to a working attribute information adding location of the bend model.

Figure 8:
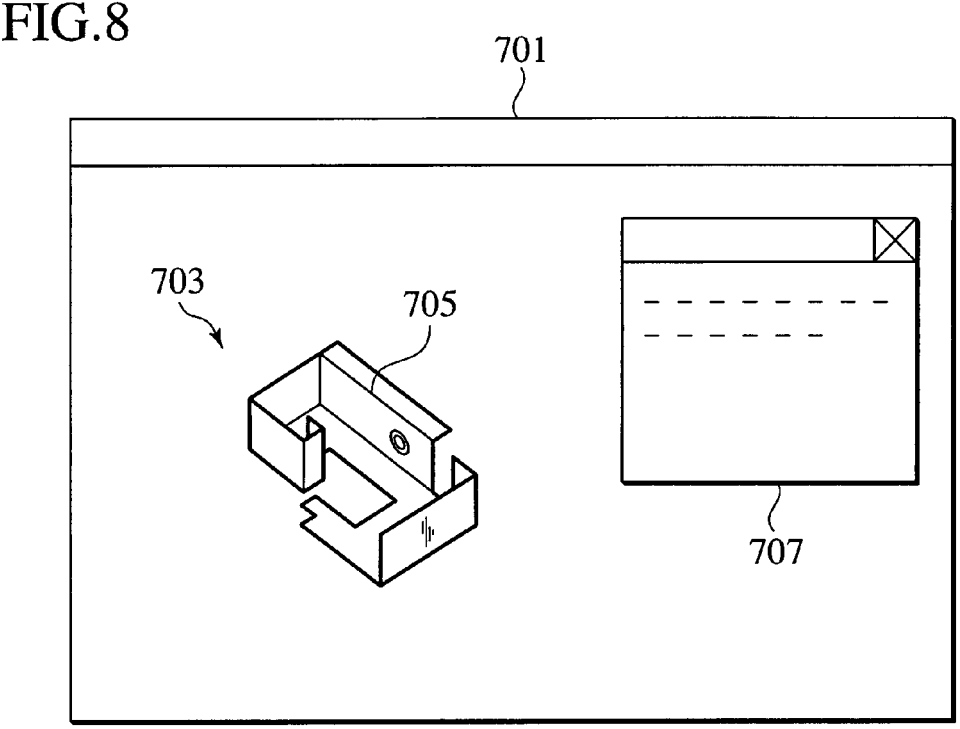
FIG. 8 is an explanatory view explaining a linking of working attribute information.

FIG. 8 shows a method of adding working attribute information to a working attribute information adding location of a bend model. The display 49 displays a screen 701. The screen shows a bend model 703. A working attribute information adding location 705 (for example, an element such as a segment) on the bend model 703 is clicked. Then, working attribute information (for example, working know-how) is input in a working attribute input window 707.

Figure 7B:
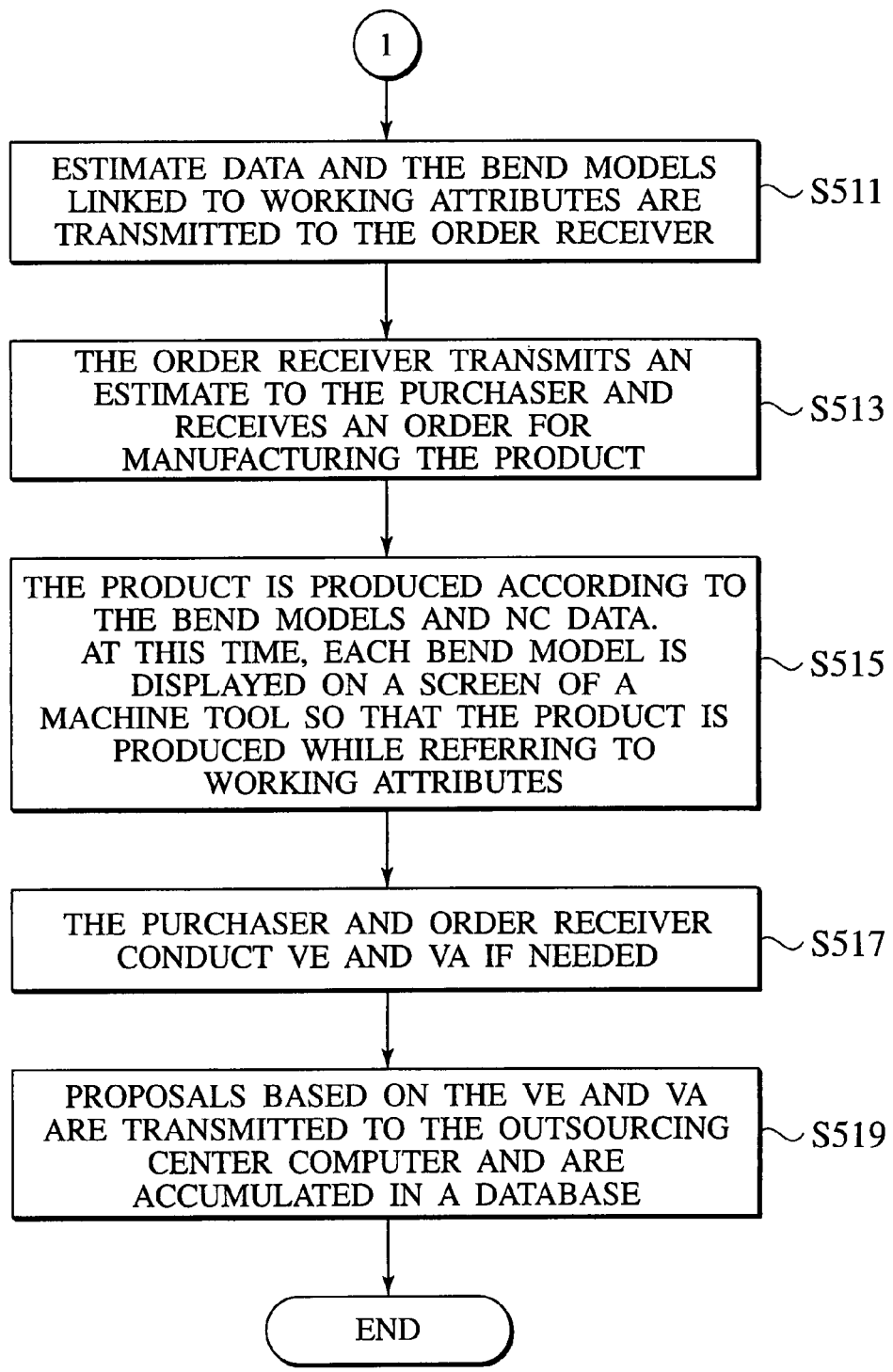

FIG. 7B is referred. In step S511, the transmitter 79 transmits the estimate data, NC data, bend model linked to working attribute information, and the like to the order receiver 5.

In step S513, the transmitter 27 of the order receiver 5 transmits an estimate and the like related to the manufacturing of the sheet metal product to the purchaser 3. Then, an official order for manufacturing the sheet metal product will be issued.

In step S515, the order receiver 5 uses the bend model, NC data for NC machine tools for machining the sheet metal product, and the like to manufacture the sheet metal product.

At this time, the bend model is displayed on the display unit 37, and an operator performs actual work with reference to the working attribute information.

Figure 9:
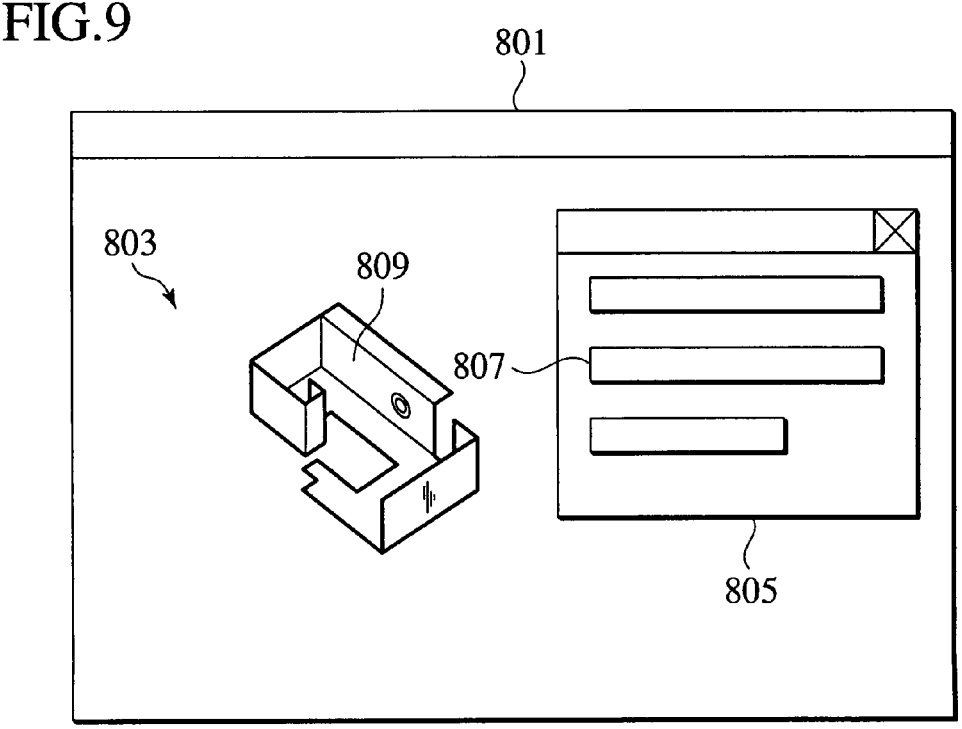
FIG. 9 is an explanatory view explaining a use of working attribute information.

FIG. 9 shows a method of letting an operator refer to working attribute information. Namely, the display unit 37 displays a screen 801. The screen 801 shows a bend model 803 and a working attribute information displaying window 805. The working attribute information displaying window 805 displays complete working attribute information linked to the bend model.

For example, working attribute information 807 is selected. Then, a working attribute information added location (for example, an element such as a segment) 809 of the bend model 803 linked to the working attribute information 807 is highlighted. Accordingly, the operator can easily refer to the working know-how.

In step S517, the order receiver 5, purchaser 3, and the like conduct, if needed, examinations such as VE and VA for manufacturing the product.

In step S519, data related to proposals from a result of the examination conducted in step S517 is transmitted to the outsourcing center computer 39 and is stored in the working know-how database 71 provided for the outsourcing center computer 39. This can be utilized for the next outsourcing service.

On the other hand, many kinds of working attribute information can be linked to working attribute information adding locations of a bend model. Examples will be explained.

A bend model may be provided with a hole attribute (for example, a fixed hole, an irregular hole/open path, a shaped/protruding hole, a special hole, a macro hole, marking, tapping, a stud, a weld nut, caulking, a press hole, and the like).

A bend model may be linked to a material attribute (for example, a material name, a sheet thickness, a material, a tensile strength, and the like).

A bend model may be linked to a bend line attribute (for example, a V-bend, an R-bend, a hemming bend, a stepped bend, and the like).

A bend model may be linked to a bend shape attribute (a length difference, a bend direction, and bumping related to a bend line; a cut-raise bend, a blind bend, a deep bend, a small bend, a large bend, a thin sheet bend, and a thick sheet bend related to a butting or bending shape; and a gradual bend, a closing bend, and a stepped bend related to a special bend shape).

The present invention is not limited to the above-mentioned embodiment. By properly modifying the embodiment, the present invention is achievable in other forms.

As mentioned above, the working attribute information linking system according to the present invention stores working attribute information linked to a bend model in a memory that is different from a memory to store the bend model.

Accordingly, a bend model may be provided with working attribute information having a different file format without correcting existing application software. This provides an effect of eliminating a need of updating applications already supplied to venders and an effect of reducing the number of software maintaining man-hours.

A bend model may be linked to many pieces of working attribute information such as working know-how (text data). Such information can be referred to by a manufacturer of sheet metal products when carrying out processes, to reduce work mistakes and man-hours.

Information written on design drawings of a sheet metal product can entirely be digitized to provide an effect of speeding up information communication.

A model structure of a sheet metal component according to a second embodiment will be explained.

Figure 10:
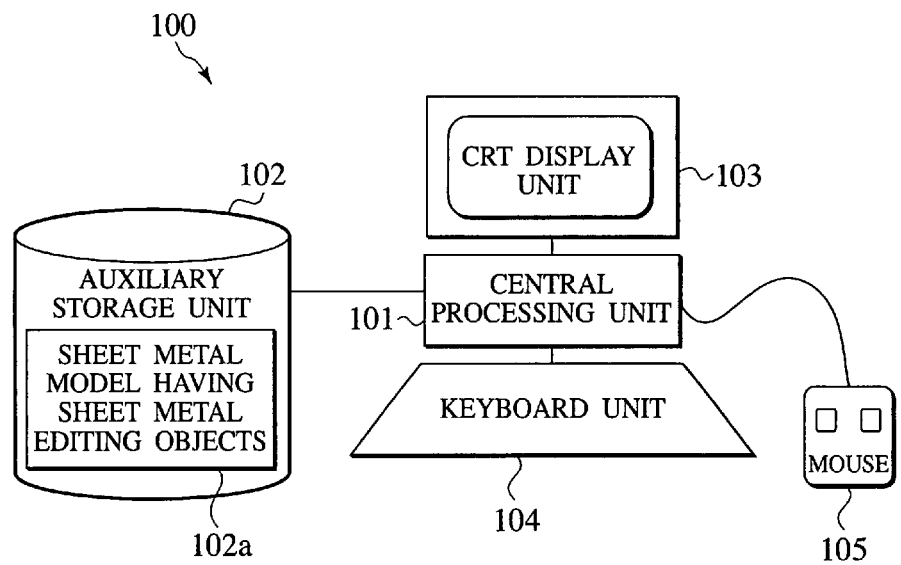
FIG. 10 is a block diagram showing a schematic structure of a CAD system according to the present invention.

FIG. 10 is a block diagram showing a schematic structure of a computer aided design (hereinafter simply referred to as CAD) system.

The CAD system 100 has a central processing unit 101 to centrally conduct data processing for the CAD system 100, an auxiliary storage unit 102 to auxiliary store data processed by the central processing unit 101, a CRT display unit 103 to display character data and graphic data supplied from the central processing unit 101, a keyboard unit 104 to input character information, and a mouse 105 to input positional information and the like.

The central processing unit 101 is an operational unit having a CPU, ROM, RAM, and the like to centrally conduct data processing for the CAD system 100. The editing of a sheet metal model to be explained later is achieved by executing a given program in this central processing unit.

The auxiliary storage unit 102 is, for example, a hard disk drive to store a large amount of data. The auxiliary storage unit 102 stores a sheet metal model 102a having sheet metal editing objects. The details of the sheet metal model 102a will be explained later.

The CRT display unit 103 includes a CRT to display pixel data based on a bitmap method. It displays character data and graphic data supplied from the central processing unit 102.

The CRT display unit 103 displays, for example, unfolded and solid views of sheet metal components.

The keyboard unit 104 has a plurality of keys to input character data. The keyboard unit 104 is used to input, for example, a gap at a butting part on a sheet metal component displayed on the CRT display unit 103.

The mouse 105 is slid on a flat face such as a desk to input positional data, which is entered when a button is pushed down. The mouse 105 is used when inputting, for example, the shape of a sheet metal component on the CRT display unit 103.

The CAD system 100 having the central processing unit 101, auxiliary storage unit 102, CRT display unit 103, keyboard unit 104, and mouse 105 may be realized with the use of, for example, a personal computer.

Next, the sheet metal model 102a stored in the auxiliary storage unit 102 and having sheet metal editing objects will be explained.

The sheet metal model has an internal structure generally including graphic element data such as segments, arcs, circumferences, and the like to express component shapes, face data composed of the graphic elements, and connection data (bend lines) to define connections between the faces.

The sheet metal model according to the embodiment contains sheet metal editing objects representing sheet metal working for "butting" and "lapping" locations. Each sheet metal editing object enables the automatic handling of a change in the shape (unfolded shape) of a sheet metal component due to a change in a processing method such as welding, a change in sheet thickness, a change in material, and the like.

More precisely, the sheet metal model includes, as sheet metal editing objects, a butting object concerning the editing of connection (butting process) at a location where nonparallel two faces butt against each other in the sheet metal model and a connection object concerning the editing of connection (lapping process) at a location where parallel two faces butt against each other in a space of the sheet metal model. The "parallel" is not limited to strict parallel and includes a case in which two faces are slightly off-parallel from each other or overlap each other in a sheet thickness direction.

In this way, this embodiment stores the editing work of a connection part of sheet metal as a sheet metal editing object in a sheet metal model. If a sheet thickness or a welding method is changed, parameters stored as attributes in the sheet metal editing object are used to automatically prepare a changed unfolded shape.

Accordingly, this embodiment can eliminate manual work of changing an unfolded shape in the CAD system, to thereby reduce the labor of a designer. In addition, the embodiment can reduce erroneous changes to be made during the editing work.

FIGS. 11A to 11D are views explaining a concrete example of a sheet metal model.

Figure 11A:
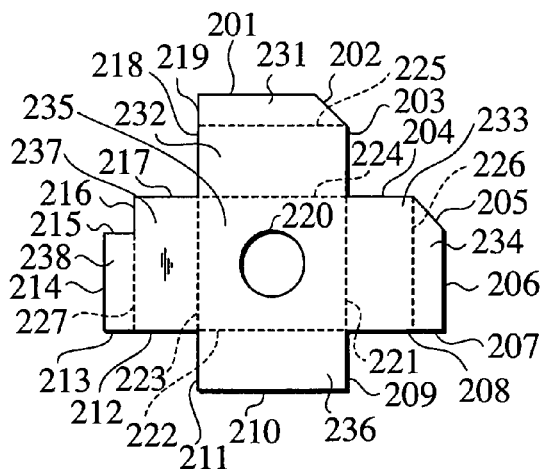
FIGS. 11A to 11D are views explaining a concrete example of a sheet metal model.
Figure 11B:
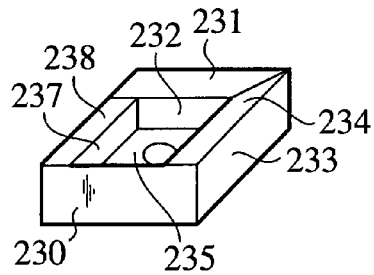

A sheet metal component edited based on this sheet metal model is shown in an unfolded view of FIG. 11A and a solid view of FIG. 11B. The sheet metal component consists of eight faces 231 to 238 connected together with seven bend lines 221 to 227.

Figure 11C:
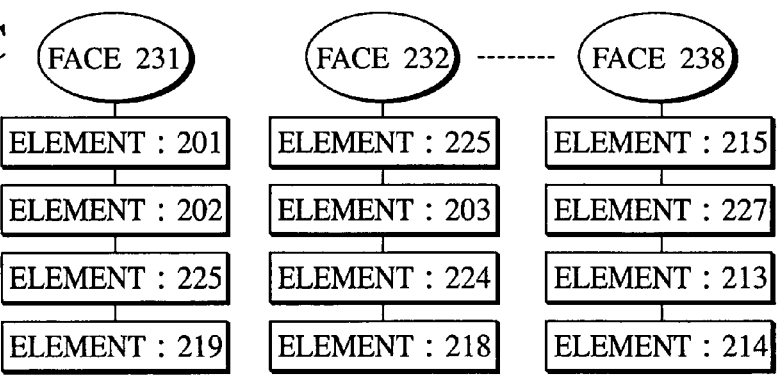
Figure 11D:
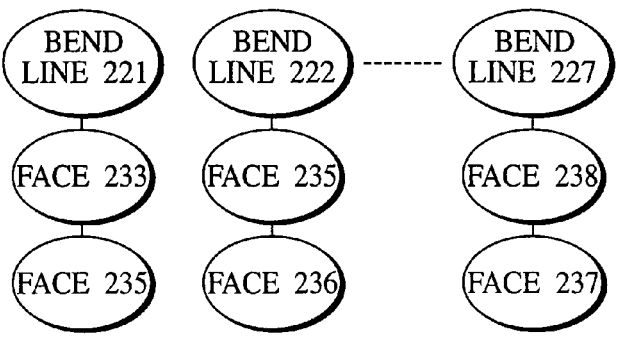

The sheet metal model representative of the sheet metal component consists of face data shown in FIG. 11C and bend line data shown in FIG. 11D.

Namely, the face data of the faces 231 to 238 is defined with segments of graphic elements expressing shapes. For example, the face 231 is defined with four segments, i.e., graphic elements 201, 202, 225, and 219. The other faces are defined in similar ways.

The bend line data defines connections of the faces 221 to 227. For example, the bend line 221 is defined to connect the faces 233 and 235 to each other. The other bend lines are similarly defined.

Figure 12A:
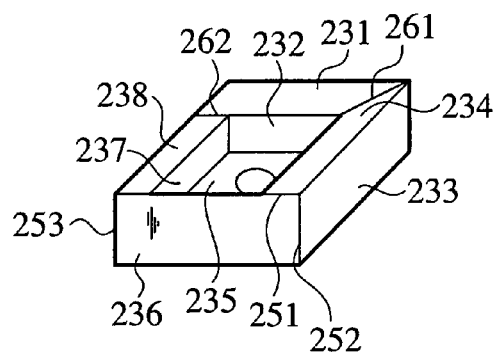
FIGS. 12A and 12B are views explaining concrete examples of sheet metal editing objects.
Figure 12B:
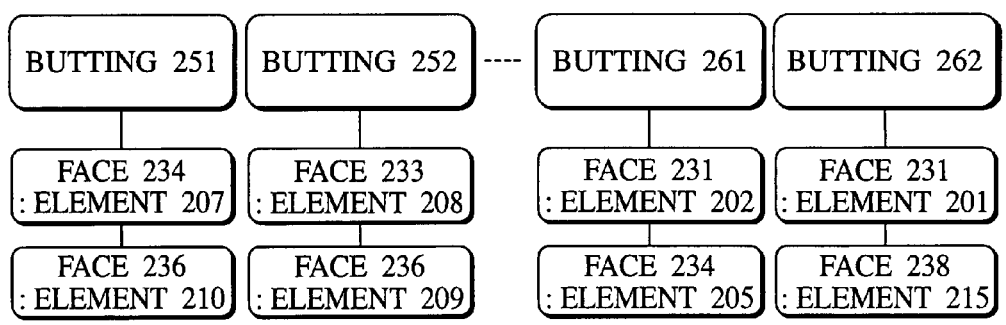

FIGS. 12A and 12B are views explaining concrete examples of sheet metal editing objects. The sheet metal editing objects are stored in the sheet metal model shown in FIG. 11. FIG. 12 shows locations of "butting" and "lapping" of this sheet metal component.

The "butting" is a connection between two nonparallel faces. Butting 251 is present between faces 234 and 236, butting 252 between faces 233 and 236, and butting 253 between faces 236 and 237.

The "lapping" is a connection between two parallel faces. Lapping 261 is present between faces 231 and 234 and lapping 262 between faces 231 and 238.

Relationships at the "butting" and "lapping" connections are defined as butting objects and lapping objects as shown in the sheet metal editing objects of FIG. 12B. For example, the butting object 251 is defined with the face 234, graphic element 207, face 236, and graphic element 210. For example, the lapping object 261 is defined with the face 231, graphic element 202, face 234, and graphic element 205.

FIGS. 13A to 13D are views explaining a concrete example of a butting object.

The butting object corresponds to a "butting" editing process that determines a connection state of two nonparallel faces that butt against each other or cross each other, according to specified attribute parameters. One butting object is assigned to two faces and graphic elements (segments) of the faces existing at the butting location.

Figure 13A:
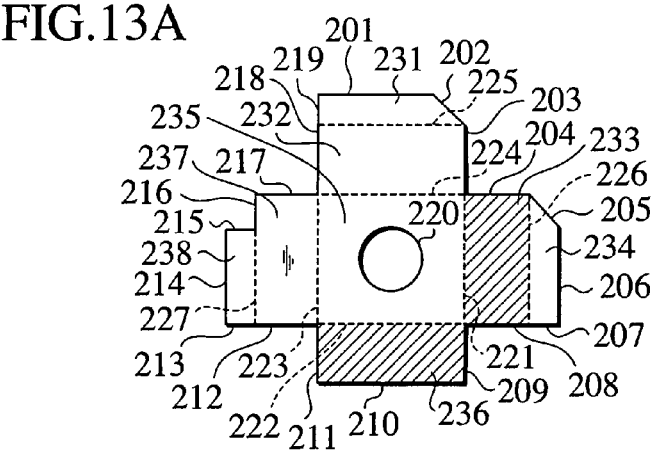
FIGS. 13A to 13D are views explaining a concrete example of a butting object.
Figure 13B:
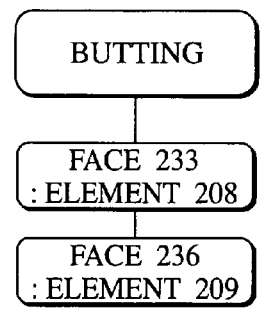

In an unfolded view of FIG. 13A, a butting object is assigned to a graphic element 208 of a face 233 and a graphic element 209 of a face 236. This butting object is defined for a sheet metal model as shown in FIG. 13B. The butting object consists of the face 233, graphic element 208, face 236, and graphic element 209.

Figure 13C:
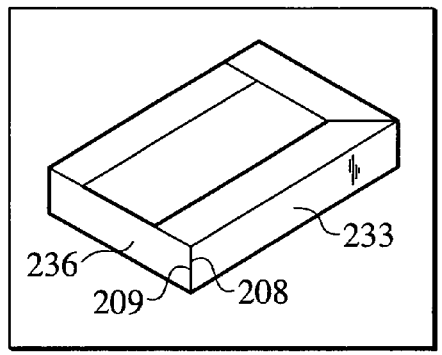

FIG. 13C shows a solid view of a sheet metal component displayed on the CRT display unit 103 of the CAD system 100 shown in FIG. 10. In the solid view, the above-mentioned butting is present between the graphic element 208 of the face 233 and the graphic element 209 of the face 236.

Figure 13D:
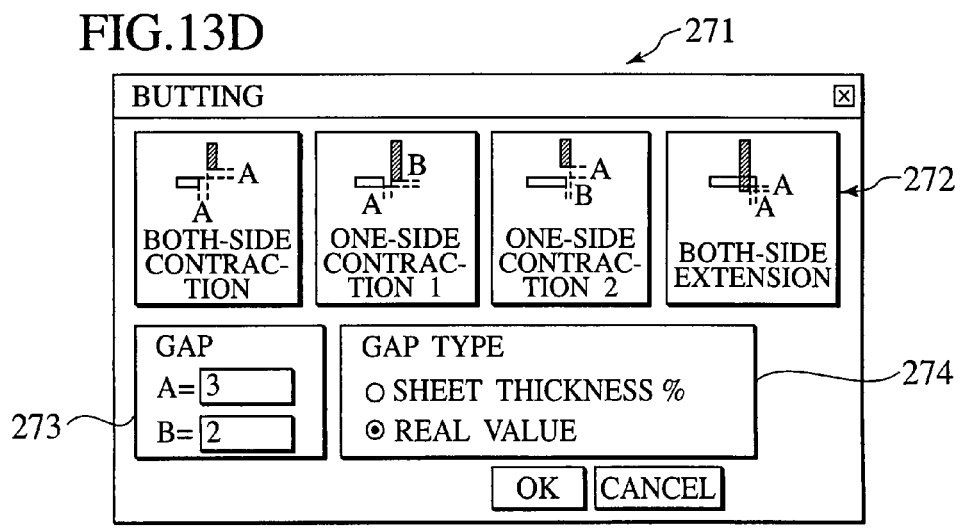

FIG. 13D shows a graphical user interface (GUI) for a butting process displayed on the CRT display unit 103.

The butting GUI 271 includes a butting kind setting zone 272 to set a butting kind, a gap setting zone 273 to set a gap at the butting, and a butting gap type setting zone 274 to set a butting gap type. The butting GUI 271 enables the setting of attributes with parameters concerning a butting object. The attributes set with parameters are stored in the butting object shown in FIG. 13B.

In the butting kind setting zone 272, it is possible to select a butting kind from among both-side contraction, one-side contraction 1, one-side contraction 2, and both-side extension. The one-side contraction 1 and one-side contraction 2 differ from each other in the face that is retracted.

The butting gap setting zone 273 sets a butting gap for each of first and second sheet metal directions. The gap is identical in each direction for the both-side contraction or both-side extension, and different gaps are set for the one-side contraction.

The butting gap type setting zone 274 allows to select a gap type from a percentage and a real value.

The butting GUI 271 is edited with the keyboard unit 104 or the mouse 105 of the CAD system 100. The same is applicable to a lapping GUI to be explained later.

Figure 14A:
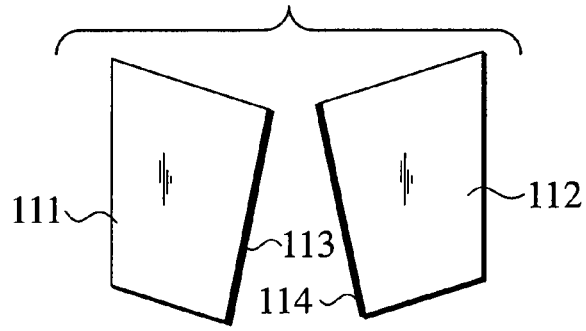
FIGS. 14A to 14C are views explaining a process for a butting object.
Figure 14B:
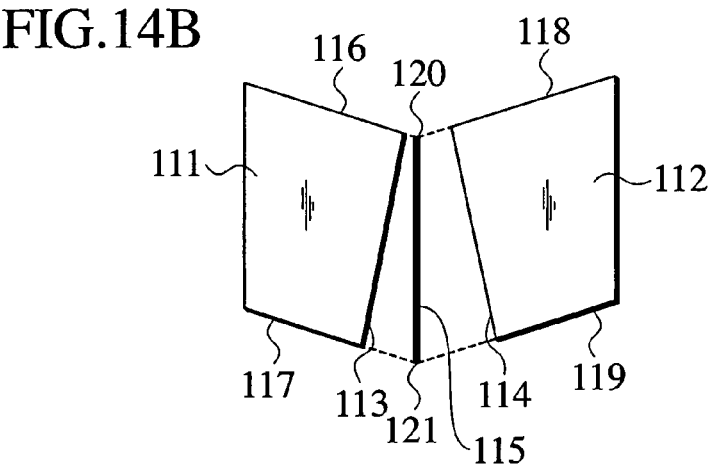
Figure 14C:
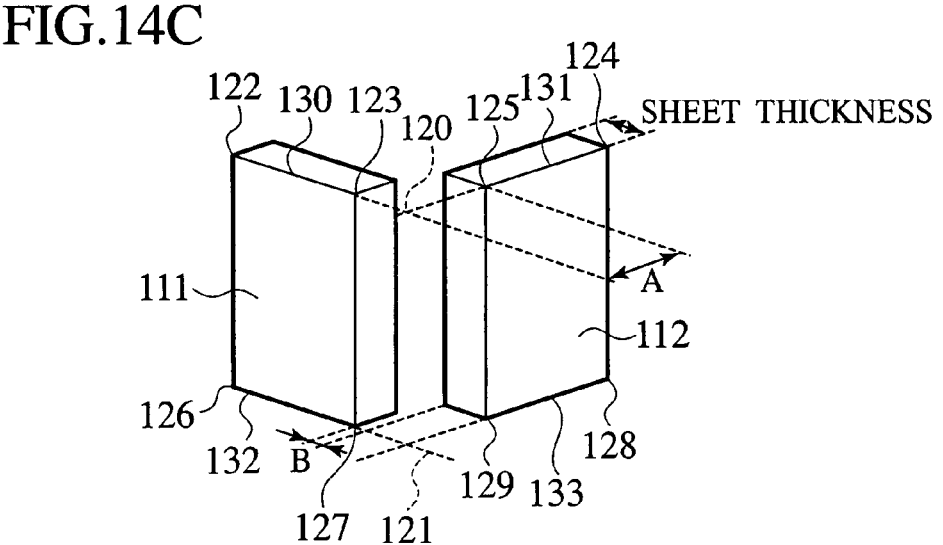

FIGS. 14A to 14C are views explaining processes for a butting object.

The processes for a butting object are carried out according to attribute values. The processes automatically regenerate a connection between faces of sheet metal if there is a change in a sheet thickness, welding method, and the like.

FIG. 14A shows an initial state. A butting instruction specifies a butting location, e.g., a segment 113 of a face 111 and a segment 114 of a face 112. Such an instruction is made in the CAD system based on a change in a sheet thickness or welding method, or an automatic shaping request.

FIG. 14B shows a calculation of a nodal line to obtain a nodal line 115 for the faces 111 and 112. Also obtained are an intersection 120 between the nodal line 115 and segments 116 and 118 adjacent to the butting segments 113 and 114 and an intersection 121 between the nodal line 115 and segments 117 and 119.

FIG. 14C shows a calculation of a butting shape. Namely, a point 123 on a segment 130 between the intersection 120 and a point 122, a point 125 on a segment 131 between the intersection 120 and a point 124, a point 127 on a segment 132 between the intersection 121 and a point 126, and a point 129 on a segment 133 between the intersection 121 and a point 128 are calculated to satisfy sheet thickness and gap parameters A and B.

FIGS. 15A to 15D are views explaining a concrete example of a lapping object.

The lapping object corresponds to an editing process to determine a connection state between parallel two faces of sheet metal according to given attribute parameters. One lapping object is assigned for two faces and graphic elements (segments) of the two faces that are in contact with each other at the lapping location.

Figure 15A:
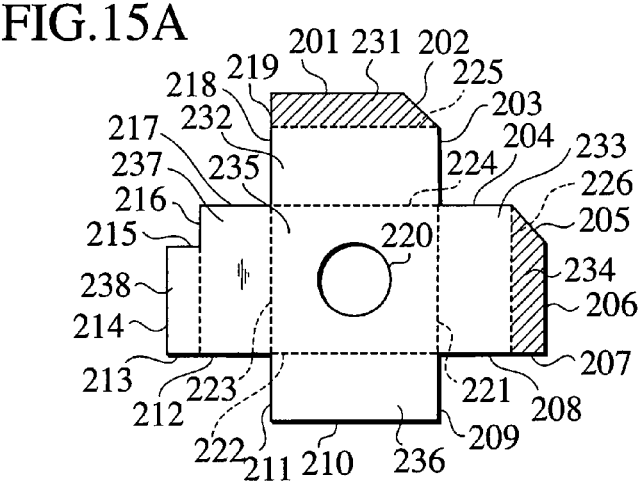
FIGS. 15A to 15D are views explaining a concrete example of a lapping object.
Figure 15B:
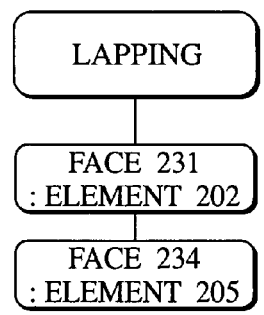

In an unfolded view of FIG. 15A, a lapping object is assigned to a graphic element 2 of a face 231 and a graphic element 205 of a face 234. In a sheet metal model, the lapping object is defined as shown in FIG. 15B. This lapping object consists of the face 231, graphic element 202, face 234, and graphic element 205.

Figure 15C:
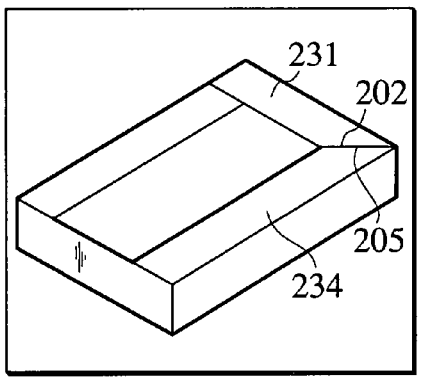

FIG. 15C is a solid view showing a sheet metal component of this example displayed on the CRT display unit 103 of the CAD system 100 shown in FIG. 10. In the solid view, the lapping is present between the graphic element 202 of the face 231 and the graphic element 205 of the face 234.

Figure 15D:
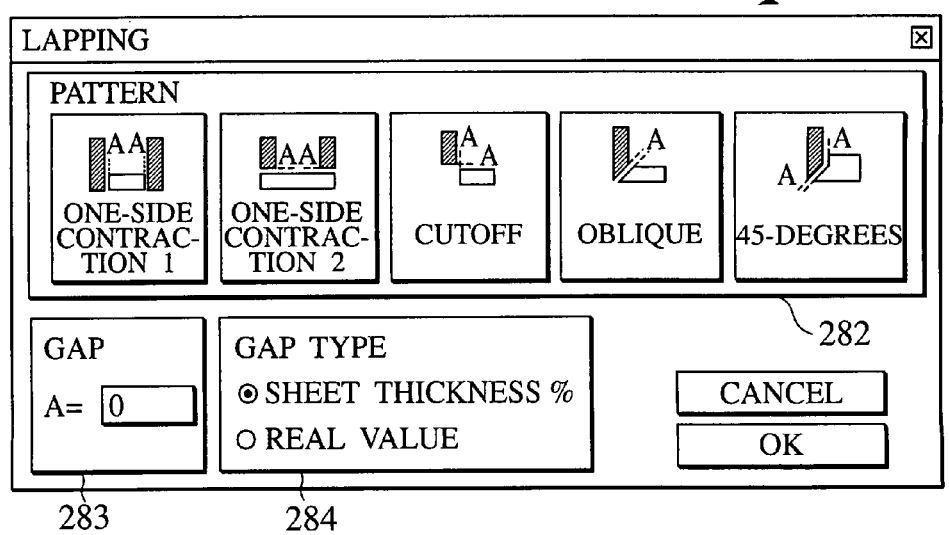

FIG. 15D shows a lapping editing GUI displayed on the CRT display unit 103.

The lapping GUI 281 includes a lapping kind setting zone 282 to set a lapping kind, a lapping gap setting zone 283 to set a lapping gap, and a lapping gap type setting zone 284 to set a lapping gap type. The lapping GUI 281 can set parameters representative of attributes of the lapping object. The set attribute parameters are stored in the lapping object shown in FIG. 15B.

In the lapping kind setting zone 282, one can select one of five kinds, i.e., one-side contraction 1, one-side contraction 2, cutoff, oblique, and 45-degrees. The one-side contraction 1 and one-side contraction 2 involve different retraction faces.

In the lapping gap setting zone 283, one can set a lapping gap. In the lapping gap type setting zone 284, one can select a gap type from a sheet thickness percentage and a real value.

FIGS. 16A to 16D are views explaining processes for a lapping object.

The processes for a lapping object are carried out according to attribute values. These processes can automatically generate a connection between sheet metal faces when a change is made in a sheet thickness or in a welding method.

Figure 16A:
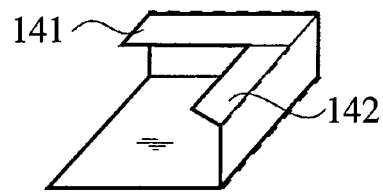
FIGS. 16A to 16D are views explaining a process for a lapping object.

In a solid view of FIG. 16A, a sheet metal component involves lapping to be processed between faces 141 and 142. Through the FIGs, dotted lines indicate bend lines.

Figure 16B:
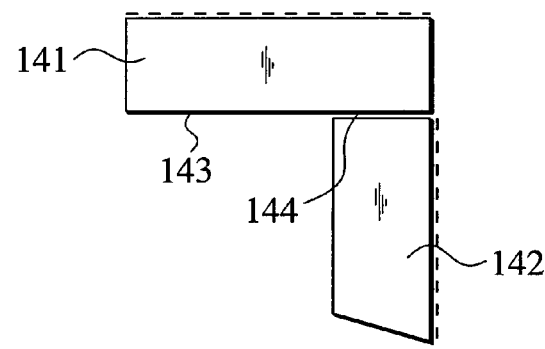

FIGS. 16A and 16B show an initial state. In response to a "lapping" instruction, a segment 143 of the face 141 and a segment 144 of the face 142 are specified at the lapping location. Here, the faces 141 and 142 have each a trapezoidal shape, and one of the top and bottom sides of each trapezoidal shape serves as a bend line. The "lapping" instruction is based on a lapping object.

Figure 16C:
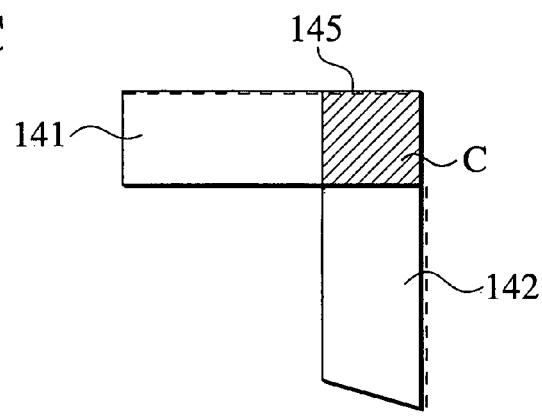

FIG. 16C shows a calculation of extensions of the two faces and an interference between them. Namely, it is tested whether or not the two faces 141 and 142 cross each other on the extensions in bend line directions. If they cross each other, one face is extended to a boundary of the opposite face (segment 145 in the FIG), to prepare a crossing shape.

Figure 16D:
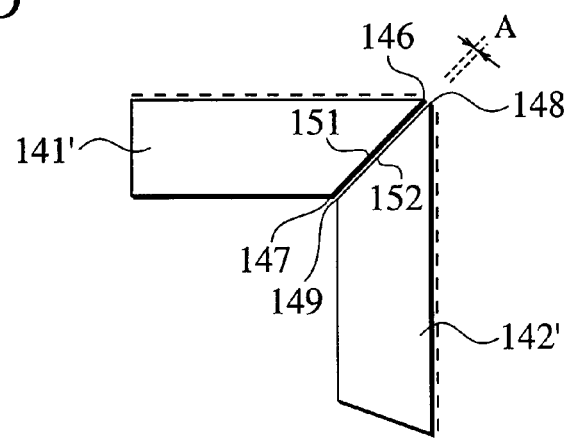

FIG. 16D shows a calculation of a lapping shape. To satisfy a lapping pattern "45-degrees" and a gap A, a segment 151 between points 146 and 147 and a segment 152 between points 148 and 149 are determined to regenerate faces 141' and 142'.

Figure 17A:
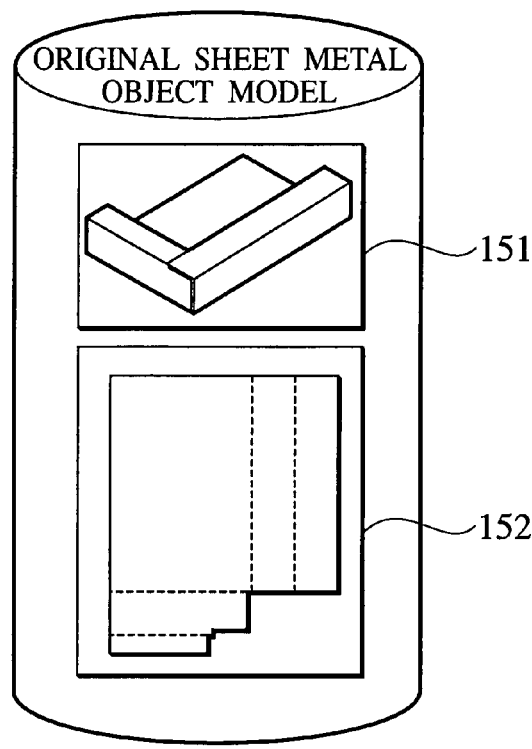
FIGS. 17A and 17B are views explaining an automatic changing process for a sheet metal model having a sheet metal editing object.
Figure 17B:
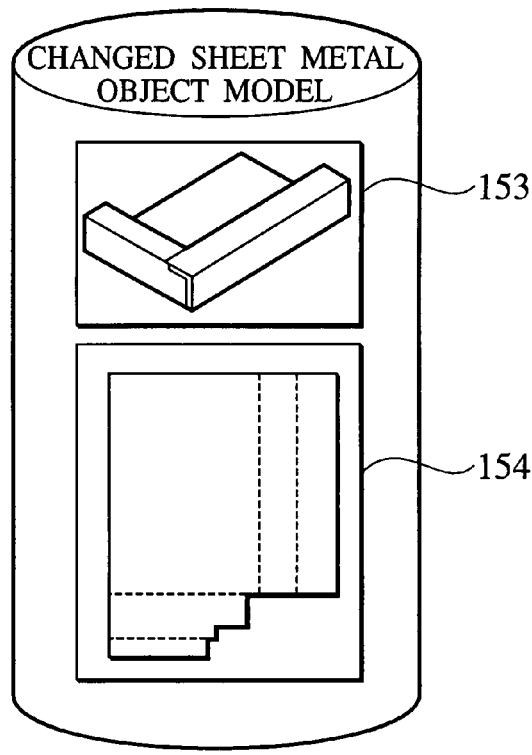

FIGS. 17A and 17B are views explaining an automatic changing process for a sheet metal model having sheet metal editing objects.

These FIGs. visually show the sheet metal model 102a having sheet metal editing objects stored in the auxiliary storage unit 102 of the CAD system.

Concerning the sheet metal model shown in FIG. 17A, it is assumed that a request for a sheet thickness change or a welding parameter change as well as a request for an automatic shape change are made.

According to the embodiment, the requests are handled by automatically changing the shape of a connection of the sheet metal component and preparing a changed sheet metal model shown in FIG. 17B.

Namely, as shown in a solid view 151 of FIG. 17A and a solid view 153 of FIG. 17B, the change in sheet thickness or welding method is handled without changing the general shape of the sheet metal component. Namely, an unfolded view 152 of FIG. 17A is automatically changed to an unfolded view 154 of FIG. 17B.

The automatic editing of the unfolded view is carried out according to a predetermined method such as the butting process of FIGS. 14A to 14C or the lapping process of FIGS. 16A to 16D. In this way, in response to a change in sheet thickness or in welding method, this embodiment can automatically process a connection such as a butting or lapping connection between sheet metal faces according to sheet metal editing objects.

As mentioned above, the present invention stores sheet metal editing processes such as butting and lapping processes as objects in a sheet metal model and automates changing an unfolded shape in response to a change in working such as welding, a change in sheet thickness, or a change in material.

The invention claimed is:

1. A working attribute information linking method for linking working attribute information to a bend model that is a three-dimensional solid model of a sheet metal product, comprising:
displaying the bend model on a display and selecting a working attribute information adding location to which the working attribute information is linked;
inputting the working attribute information to be linked to the working attribute information adding location;
linking the working attribute information and the working attribute information adding location in the bend model, without changing data contents of the bend model; and
storing the bend model in a bend model memory and the working attribute information in a working attribute information memory, separately stored and different from the bend model memory, while maintaining the linkage, wherein the linkage provides access to the working attribute information related to the bend model, which working attribute information is otherwise unavailable.

2. The working attribute information linking method as set forth in claim 1, comprising:
displaying the bend model, working attribute information, and working attribute information adding location related to one another on the display.

3. The working attribute information linking method as set forth in claim 2, wherein the displaying the bend model, working attribute information, and working attribute information adding location related to one another on the display includes highlighting the working attribute information adding location of the bend model when the working attribute information is clicked.

4. The working attribute information linking method as set forth in claim 1, comprising:
editing that includes changing, correcting, or deleting the working attribute information.

5. The working attribute information linking method as set forth in claim 1, wherein the working attribute information is text data representative of the contents of working know-how.

6. The working attribute information linking method as set forth in claim 5, comprising:
retrieving the working attribute information to be added to the working attribute information adding location from a working know-how database that stores working know-how.

7. A working attribute information linking system for linking working attribute information to a bend model that is a three-dimensional solid model of a sheet metal product, comprising:
a display displaying the bend model and selecting a working attribute information adding location to which the working attribute information is linked;
an input inputting the working attribute information to be linked to the working attribute information adding location;
a linkage forming unit linking the working attribute information and the working attribute information adding location in the bend model, without changing data contents of the bend model; and
a bend model memory storing the bend model and the working attribute information in a working attribute information memory, separately stored and different from the bend model memory, while maintaining the linkage, wherein the linkage provides access to the working attribute information related to the bend model, which working attribute information is otherwise unavailable.

8. A model structure of a sheet metal component used for editing the sheet metal component with the use of a computer, comprising:
a sheet metal object having graphic element data for defining graphic elements of sheet metal, face data for defining faces each composed of graphic elements, and connection data for defining each connection between faces, and wherein the sheet metal object includes a sheet metal editing object corresponding to a sheet metal editing process.

9. The model structure of a sheet metal component as set forth in claim 8, wherein the sheet metal editing object corresponds to an editing process of sheet butting or an editing process of sheet lapping.

10. The model structure of a sheet metal component as set forth in claim 9, wherein the sheet metal editing object corresponding to an editing process of sheet butting includes, as attributes, a butting kind of both-side contraction, one-side contraction, or both-side extension, a gap, and a gap type.

11. The model structure of a sheet metal component as set forth in claim 9, wherein the sheet metal editing object corresponding to an editing process of sheet lapping includes, as attributes, a lapping kind of one-side contraction, cutoff, oblique, or 45-degrees, a gap, and a gap type.

12. The working attribute information linking method as set forth in claim 1, wherein the bend model and working attribute information are with different file formats.

13. The model structure of a sheet metal component as set forth in claim 8, wherein the bend model and working attribute information are with different file formats.

14. The working attribute information linking method as set forth in claim 1, wherein the linking has a one-to-one correspondence between the working attribute information and the working attribute information adding location.

15. The working attribute information linking system as set forth in claim 7, wherein the linking has a one-to-one correspondence between the working attribute information and the working attribute information adding location.

* * * * *

UNITED STATES PATENT AND TRADEMARK OFFICE
CERTIFICATE OF CORRECTION

| | | |
|---|---|---|
| PATENT NO. | : 8,725,282 B2 | Page 1 of 1 |
| APPLICATION NO. | : 10/488246 | |
| DATED | : May 13, 2014 | |
| INVENTOR(S) | : M. Ishii et al. | |

It is certified that error appears in the above-identified patent and that said Letters Patent is hereby corrected as shown below:

On Title Page (86) PCT No.: of the printed patent, "PCT/JP02/00910" should be -- PCT/JP02/09106 --.

Signed and Sealed this
Seventeenth Day of March, 2015

Michelle K. Lee
*Director of the United States Patent and Trademark Office*